United States Patent
Gibby

(10) Patent No.: US 6,364,399 B1
(45) Date of Patent: Apr. 2, 2002

(54) PRESSURIZED STRUCTURAL MEMBER OF A MOTOR VEHICLE FRAME

(75) Inventor: Dale G. Gibby, Inkster, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/635,940

(22) Filed: Aug. 10, 2000

(51) Int. Cl.⁷ .............................................. B62D 25/02
(52) U.S. Cl. .................. 296/187; 296/188; 296/203.03; 280/784
(58) Field of Search .......................... 280/784; 296/187, 296/203.03, 188, 189; 293/133, 134, 135, 137

(56) References Cited

U.S. PATENT DOCUMENTS

| | | | | | |
|---|---|---|---|---|---|
| 2,202,050 | A | * 5/1940 | Gibbons | ................. | 293/137 X |
| 3,023,915 | A | * 3/1962 | Keller | .................... | 293/137 X |
| 3,804,446 | A | * 4/1974 | Warrener | ................ | 293/137 X |
| 4,235,317 | A | * 11/1980 | Maciejewski | ........... | 293/134 X |
| 4,643,448 | A | 2/1987 | Loren | .......................... | 280/777 |
| 4,893,857 | A | * 1/1990 | Bobinger et al. | ........... | 293/136 |
| 5,094,034 | A | 3/1992 | Freeman | ....................... | 49/501 |
| 5,141,279 | A | 8/1992 | Weller | ......................... | 280/751 |
| 5,544,933 | A | 8/1996 | Shahab et al. | .............. | 296/189 |
| 5,727,815 | A | 3/1998 | Smith | ......................... | 280/784 |
| 5,845,937 | A | 12/1998 | Smith | ......................... | 280/784 |
| 5,908,204 | A | 6/1999 | Smith | ......................... | 280/741 |

FOREIGN PATENT DOCUMENTS

| | | | | |
|---|---|---|---|---|
| GB | 1434408 | * 5/1976 | ................. | 293/134 |
| GB | 2191450 | 12/1987 | | |

* cited by examiner

Primary Examiner—Dennis H. Pedder
(74) Attorney, Agent, or Firm—Mark P. Calcaterra

(57) ABSTRACT

An elongated structural member of a vehicle frame. The structural member is hollow to form an elongated chamber. Filler material in the chamber is compressed by a source of pressure to press the filler material laterally outwardly against the walls of the chamber to strengthen the structural member and resist buckling. The filler material includes a flexible bag filled with small solid particles. The source of pressure may include one or more compression coil springs, or a tension rod or a gas generant.

13 Claims, 3 Drawing Sheets

PRESSURIZED STRUCTURAL MEMBER OF A MOTOR VEHICLE FRAME

This invention relates generally to motor vehicle frames and more particulary to a pressured structural member of a vehicle frame.

BACKGROUND OF THE INVENTION

The frame is a large part of the total weight of a motor vehicle and is also a large part of the protection provided for vehicle occupants. Engineers are constantly looking for ways to reduge the weight of the vehicle frame, to improve fuel economy and to reduce cost, but without sacrificing the rigidity and buckle strength of the structural members that make up the frame.

SUMMARY OF THE INVENTION

In accordance with the present invention, one or more of the structural members of the vehicle frame are hollow to reduce its weight. Filler material occupies a major portion of the chamber. The filler material is less dense than the structural material and the cost is lower. Spring means in the chamber imposes a constant force on the filler material to press the filler material outwardly against the walls of the structural member. The internal pressure on the walls of the structural member increases its strength and resistance to buckling.

Further in accordance with the invention, a compression coil spring is provided at one end of the chamber. Although not a requirement, a pressure plate is placed between the spring and the filler material. A second spring may be provided at the opposite end of the chamber to compress the filler material at both ends. A center spring may be added, if desired.

The filler material is preferably formed of relatively small incompressible particles which may be pebbles or cut-up parts of rubber tires or any inexpensive solid material that may be selected to fill the chamber. Although not a requirement, the filler material may be contained within a bag to prevent shear forces between the filler material and the structural member. Highly viscous fluids such as gels and pastes can be used as filler material. The filler material should be incompressible, non-leaking, inexpensive and low density.

One object of this invention is to provide a pressurized structural member for the frame of a motor vehicle which is of reduced weight and cost but which also is highly resistant to buckling.

Another object is to provide a pressurized structural member which does not have the disadvantage of leakage associated with stored-gas-pressurized structures.

Another object of the invention is to provide a pressurized structural member for the vehicle frame which is composed of a relatively few simple parts, is rugged and durable in use, and is highly effective in the performance of its intended function.

These and other objects, features and advantages of the invention will become more apparent as the following description proceeds, especially when considered with the accompanying drawings.

DETAILED DESCRIPTION OF THE PREFERRED EMBODIMENTS

Figure 1:
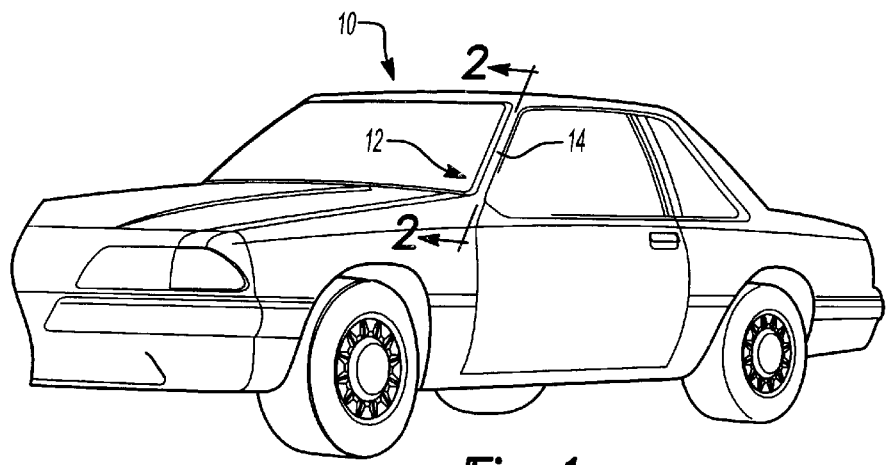
FIG. 1 is a fragmentary perspective view of the body of a motor vehicle having a frame including a structural member constructed in accordance with the present invention.

Referring now more particularly to the drawings, and especially FIG. 1, there is shown a motor vehicle body 10 having a frame 12 including an elongated structural member 14 often referred to as an "A" pillar.

Figure 2:
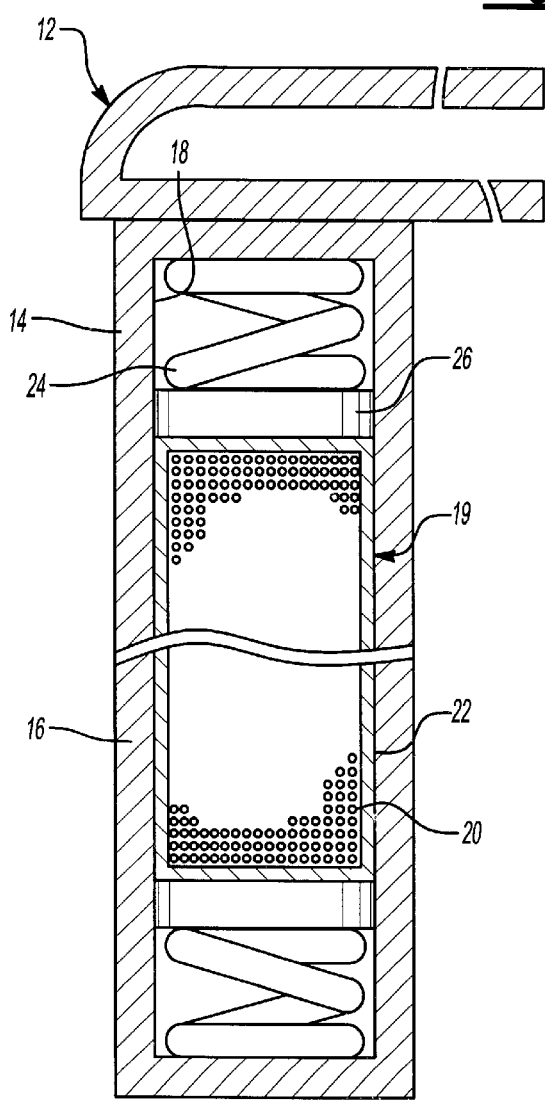
FIG. 2 is a sectional view taken on the line 2—2 in FIG. 1.

The structural member 14 is best shown in FIG. 2 where it will be seen as being hollow, having a side wall 16 defining an elongated chamber 18 extending lengthwise within the structural member. The chamber 18 may be of any suitable cross-section but preferably the chamber is cylindrical, that is, it is of uniform circular cross section throughout its length. The chamber 18 is a closed chamber.

Inside the chamber 18 is filler material 19, preferably including solid particulate or granular material 20 in a bag 22. The particulate material could be coarse sand or small pebbles or bits of plastic or bits of rubber cut from old or used automotive pneumatic tire casings. The range of suitable particulate material is almost limitless, but the particulate material preferably consists of a multiplicity of relatively small solid particles. The bag 22 containing the particulate material 20 might be a flexible polyethylene bag, sealed to prevent the escape of the material.

A compression coil spring 24 is disposed within the chamber 18 at one end thereof. A pressure plate 26 slidable longitudinally within the chamber is disposed between the coil spring 24 and the bag 22 of particulate material. The bag of particulate material occupies the entire space between the pressure plate 26 and the opposite end of the chamber.

The coil spring 24 is compressed so that it imposes a constant force upon the pressure plate 26. The spring should be compressed as part of the manufacturing process prior to placing it in the chamber 18. The pressure plate transmits the force of the spring against the bag 22 of particulate material, pressurizing the particulate material within the bag and forcing the particulate material laterally outwardly against the side wall 16 of the structural member. The imposition of internal pressure on the side wall of the structural member increases the strength of the structural member and its resistance to buckling.

Figure 3:
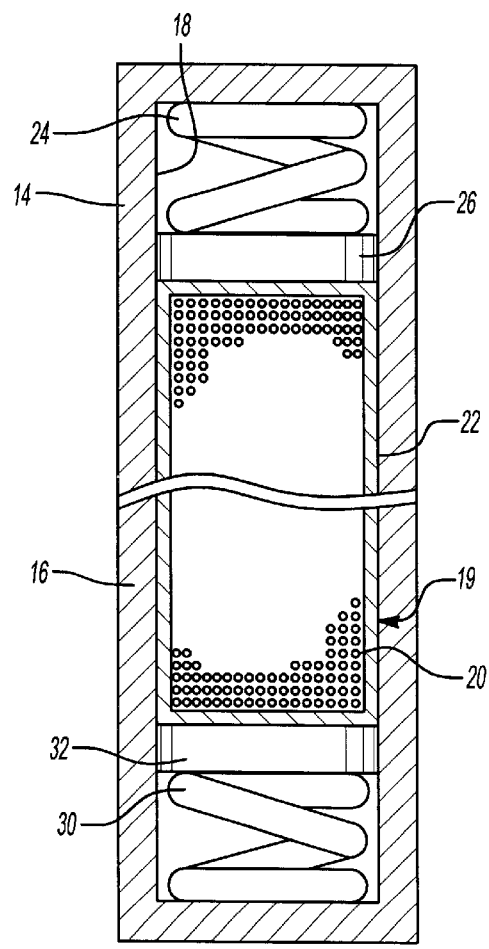
FIG. 3 is a view similar to FIG. 2 but shows a modification.

FIG. 3 shows the structural member 14 with the bag 22 of particulate material 20 in the chamber 18 and the compression coil spring 24 and pressure plate 26 at one end of the chamber, all as in FIG. 2, but with the addition of a second compression coil spring 30 and a second axially slidable pressure plate 32. The second compression coil spring 30 is at the opposite end of the chamber from the compression coil spring 24, and the pressure plate 32 is between the compression coil spring 30 and the bag 22. The bag 22 of particulate material is somewhat shorter in FIG. 3 than in FIG. 2 to accommodate two coil springs and two pressure plates instead of one. Both compression coil springs are under compression to maintain a constant pressure on the particulate material in the bag 22. The construction in FIG.

3 has an advantage over the FIG. 2 construction in that both ends of the bag of particulate material are subjected to the pressure of a spring. When using only a single spring at one end of the chamber, as in FIG. 2, the pressure of the single spring against the particulate material will be strongest adjacent to that spring, but then the pressure dissipates somewhat towards the opposite end of the chamber. By providing compression coil springs at both ends of the chamber, the bag of particulate material is more uniformly pressurized throughout its length.

Figure 4:
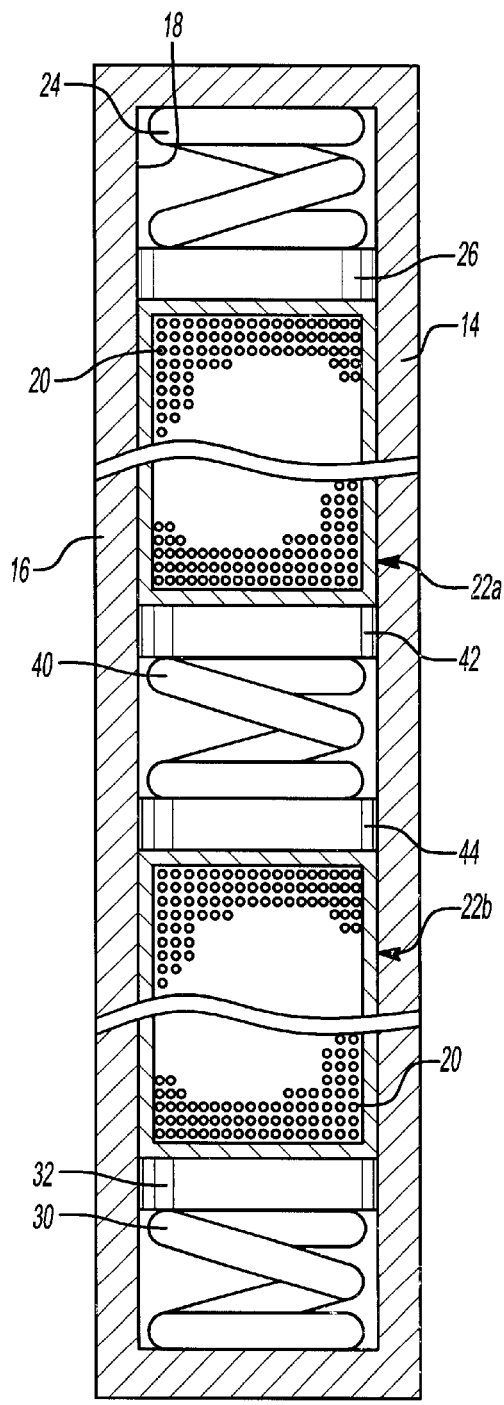
FIG. 4 is a sectional view similar to FIG. 2 but shows a further modification.

FIG. 4 is similar to FIG. 3 but with the addition of a center compression coil spring 40 and axially slidable pressure plates 42 and 44, and two flexible sealed bags 22a and 22b of particulate material 20 instead of one. The pressure plate 42 is between the center spring 40 and the bag 22a, and the pressure plate 44 is between the center spring 40 and the bag 22b. This construction is like FIG. 3 in that it has the compression coil springs 24 and 30 at opposite ends of the chamber 18 with the associated axially slidable pressure plates 26 and 32, but adds a third compression coil spring 40 and pressure plates 42 and 44. All three compression coil springs 24, 30 and 40 are under compression to maintain a constant pressure on the particulate material in the two bags. The two bags of particulate material are compressed, causing the particulate material therein to be pressurized and to press outwardly against the side wall of the structural member to increase the strength and resistance to buckling of the structural member. Using three springs provides a more uniform distribution of pressure upon the particulate material than either the FIG. 2 or FIG. 3 construction.

Figure 5:
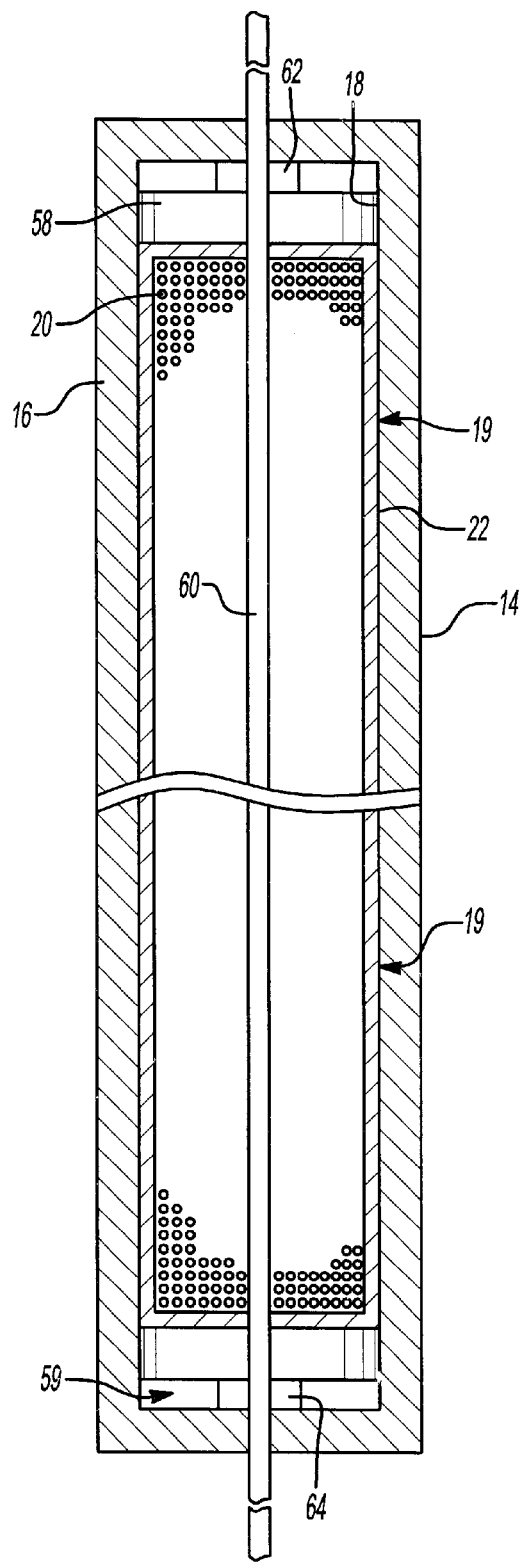
FIG. 5 is a sectional view similar to FIG. 2 but shows a still further modification.

FIG. 5 shows the bag 22 of particulate material 20 in the chamber 18 of the structural member 14 and, like FIG. 2, has axially slidable pressure plates 58 and 59 in the chamber at opposite ends of the bag 22. A tension rod 60 extends lengthwise within the chamber and through the bag 22 and the pressure plates 58 and 59 and is held in tension by nuts 62 and 64 threaded on opposite end portions of the rod and bearing against the pressure plates 58 and 59. The bag is sealed around the rod. The tension on the rod 60 causes the pressure plates 58 and 59 to maintain a constant pressure on the particulate material 20, pressing it laterally outwardly against the side wall of the chamber, thereby strengthening the structural member and increasing its resistance to buckling.

Figure 6:
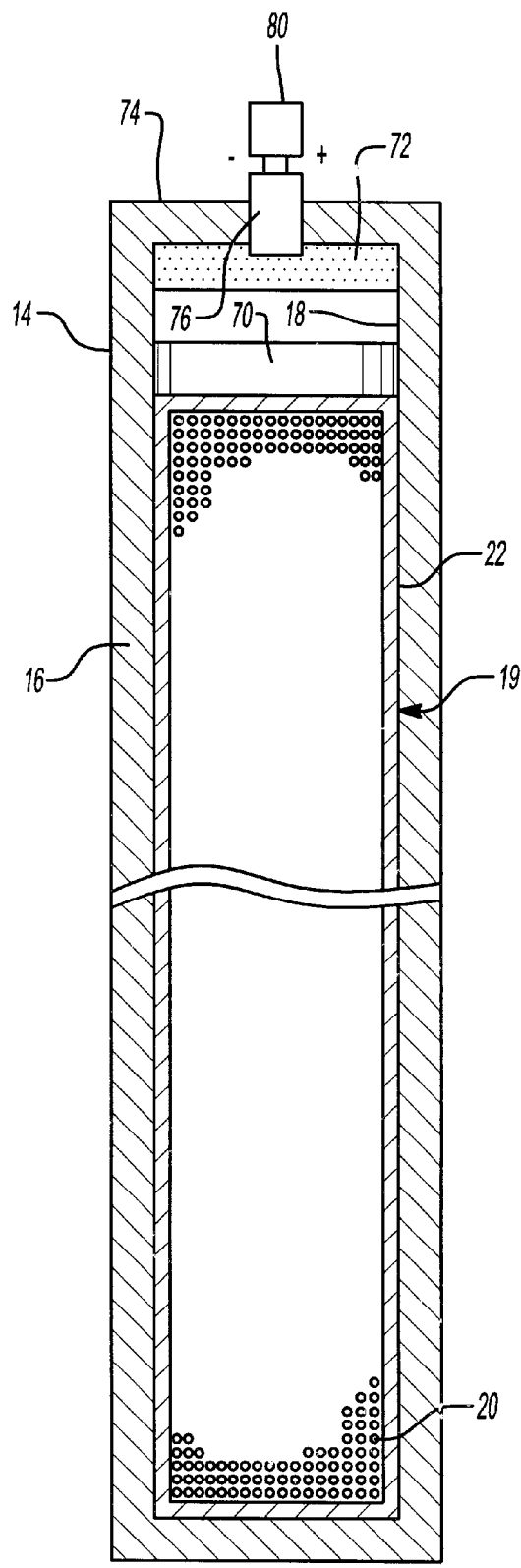
FIG. 6 is a sectional view similar to FIG. 2 but shows another modification.

FIG. 6 shows the flexible bag 22 of particulate material 20 in the chamber 18 of the structural member 14. A pressure plate 70 axially slidable within the chamber engages one end of the bag. The opposite end of the bag engages one end of the chamber.

A suitable pyrotechnic solid fuel gas generant 72 is contained a relatively small space in the chamber 18 between the pressure plate 70 and the end wall 74 of the chamber. An initiating means 76 for activating the generant 72 is mounted in the end wall 74. The initiating means could comprise an electrical initiating squib and is connected to a suitable triggering means 80 which might comprise a remote electronic collision or rapid deceleration sensor. Examples of suitable triggering means can be found in U.S. Pat. Nos. 4,706,990, 5,406,889 and 5,727,815 which are incorporated herein by reference.

When the initiating means 76 is triggered by the triggering means 80, the solid fuel gas generant 72 is activated to produce an amount of gas to fill the space in the chamber 18 between the end wall 74 and the pressure plate 70. This space is sealed so as to be gas-tight. The pressure of the gas presses the pressure plate 70 against the bag 22 of particulate material 20 which is compressed and forced laterally outwardly against the side wall of the chamber, to thereby strengthen and increase the resistance to buckling of the structural member.

It will be understood that in the FIG. 6 embodiment, the chamber 18 is not pressurized until the triggering of the initiation means, which takes place in response to a rapid deceleration of the vehicle, as when the vehicle is involved in a head-on collision.

There are in existence pyrotechnic-actuated gas-pressurized beams that do not incorporate filler material. However, by filling most of the space in the chamber 18 with filler material, the size and cost of the inflator is greatly reduced. The volume to be pressurized by gas is much less due to the presence of the filler material.

In all of the embodiments described herein, the bag 22 of particulate material 20 preferably occupies a major portion of the space within the chamber 18.

What is claimed is:

1. An elongated structural member of a vehicle frame, said elongated member having walls defining an elongated chamber therein extending lengthwise thereof, filler material in said chamber, wherein said filler material comprises solid particles contained within a flexible bag, and spring means in said chamber imposing a constant force on said filler material to press said filler material outwardly against the walls of said structural member to strengthen said structural member and resist buckling thereof.

2. An elongated structural member as defined in claim 1, wherein said filler material occupies a major portion of said chamber.

3. An elongated structural member as defined in claim 1, wherein said spring means includes a compression coil spring in said chamber.

4. An elongated structural member as defined in claim 2, further including a pressure plate axially slidable within said chamber between said coil spring and said filler material.

5. An elongated structural member as defined in claim 1, wherein said spring means includes a compression coil spring in said chamber and further comprising a pressure plate axially slidable within said chamber between said coil spring and said filler material, and said filler material substantially fills said chamber from said pressure plate to the end of said chamber.

6. An elongated structural member as defined in claim 5, wherein said filler material occupies a major portion of said chamber.

7. An elongated structural member as defined in claim 1, wherein said spring means includes a first compression coil spring in said chamber at one end thereof, a first pressure plate axially slidable within said chamber between said first coil spring and said filler material, a second compression coil spring in said chamber at another end thereof, and a second pressure plate axially slidable within said chamber between said coil spring and said filler material, said filler material substantially filling said chamber between said pressure plates.

8. An elongated structural member as defined in claim 7, wherein said filler material occupies a major portion of said chamber.

9. An elongated structural member as defined in claim 1, wherein said spring means includes a first compression coil spring in said chamber at one end thereof, a second compression coil spring in said chamber at another end thereof, a third compression coil spring between said first and second coil springs, first and third pressure plates axially slidable within said chamber between said first and third coil springs, second and fourth pressure plates axially slidable within said chamber between said second and third coil springs, said filler material includes a first bag of solid particles between said first and third pressure plates and a second bag of solid particles between said second and fourth pressure plates.

10. An elongated structural member as defined in claim 1, wherein said spring means includes an elongated tension rod extending lengthwise within said chamber through said filler material and through first and second pressure plates respectively engaging opposite ends of said filler material, said pressure plates being axially slidable within said chamber, first and second nuts threaded on opposite ends of said tension rod and bearing on said respective pressure plates to maintain said tension rod in tension and impose a force on said pressure plates causing said pressure plates to press against the opposite ends of the filler material.

11. An elongated structural member as defined in claim 10, wherein said filler material occupies a major portion of the space within said chamber.

12. An elongated structural member of a vehicle frame, said elongated member comprising;

walls defining an elongated sealed gas-tight chamber therein extending lengthwise thereof, filler material in said chamber from a point adjacent one end of said chamber to a point spaced from the opposite end of said chamber to provide a space for gas generant in said space, and means for activating said gas generant to fill said space with compressed gas to compress said filler material and force said filler material laterally outwardly against the walls of the chamber, to thereby strengthen and increase the resistance to buckling of the structural member.

13. An elongated structural member as defined in claim 12, wherein said filler material occupies a major portion of said chamber, and said filler material includes a flexible bag with solid particles.

* * * * *